(12) United States Patent
Chen et al.

(10) Patent No.: US 7,254,011 B2
(45) Date of Patent: Aug. 7, 2007

(54) MOUNTING APPARATUS FOR POWER SUPPLY

(75) Inventors: Yun-Lung Chen, Tu-Cheng (TW); Hui Li, Shenzhen (CN)

(73) Assignees: Hong Fu Jin Precision Industry (Shenzhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 132 days.

(21) Appl. No.: 10/891,952

(22) Filed: Jul. 15, 2004

(65) Prior Publication Data

US 2005/0111169 A1    May 26, 2005

(30) Foreign Application Priority Data

Nov. 21, 2003   (TW) .............................. 92220588 U

(51) Int. Cl.
*G06F 1/16*  (2006.01)
(52) U.S. Cl. .................. 361/679; 361/683; 361/685
(58) Field of Classification Search ............... 361/683, 361/679, 610, 685, 724–727
See application file for complete search history.

(56) References Cited

U.S. PATENT DOCUMENTS

| 5,777,848 A | * | 7/1998 | McAnally et al. ........... 361/725 |
| 6,288,332 B1 | * | 9/2001 | Liu et al. ................... 174/52.1 |
| 6,381,131 B1 | * | 4/2002 | Liu et al. .................... 361/685 |
| 6,530,628 B1 | * | 3/2003 | Huang et al. ............. 312/223.2 |
| 6,944,013 B2 | * | 9/2005 | Yang .......................... 361/683 |

FOREIGN PATENT DOCUMENTS

TW            88219428            9/2001

* cited by examiner

*Primary Examiner*—Lisa Lea-Edmonds
*Assistant Examiner*—Ingrid Wright
(74) *Attorney, Agent, or Firm*—Wei Te Chung

(57) ABSTRACT

A power supply mounting apparatus includes a case (20), and a mounting bracket (30). The case includes a rear panel (210) and a side panel (220), respectively forming many of supporting plates (215, 222) to support a power supply (10) thereon. The mounting bracket includes a first plate (310) and a second plate (320). The rear panel defines a slot (217) and the side panel defines a pair of locking apertures (224) therein. The first plates forms a hook (312) for rotatably receiving in the slot of the case. The second plates forms a pair of resilient catches (328) engaging in the locking apertures of the case.

13 Claims, 4 Drawing Sheets

MOUNTING APPARATUS FOR POWER SUPPLY

BACKGROUND OF THE INVENTION

1. Field of the Invention

The present invention relates to mounting apparatuses for power supplies, and particularly to a mounting apparatus for readily and securely attaching a power supply to a computer case.

2. Description of the Related Art

Generally speaking, a power supply is necessarily to be assembled in a computer enclosure. The power supply is often directly attached to a rear panel of the computer enclosure by a plurality of screws. However, this requires extra tools such as screwdrivers in assembly or disassembly and is unduly laborious and time-consuming. Additionally, the assembly process requires a long assembly line, which lowers assembly efficiency. Furthermore, an unworkable work site will lead to paralysis of the whole assembly line.

Another conventional mounting way is to assemble a power supply to a bracket, and then attach the bracket together with the power supply to the computer enclosure. By this way, the power supply is assembled in another assembly line, thereby avoiding the paralysis of the whole assembly line when an unworkable work site occurs. Examples are disclosed in Taiwan Patent Application No. 88219428. However, screws are still needed to fix the bracket to the computer enclosure. When maintaining or repairing the power supply, screwdrivers are still needed to unscrew the screws to take the power supply off.

Thus, a mounting apparatus for a power supply which solves the above-mentioned problems is strongly desired.

SUMMARY OF THE INVENTION

Accordingly, an object of the present invention is to provide a mounting apparatus with a simple structure which readily allows attachment and removal of a power supply to and from a computer case.

To achieve the above-mentioned object, a mounting apparatus in accordance with the preferred embodiment of the present invention is used to mount a power supply. The power supply mounting apparatus includes a case, and a mounting bracket. The case includes a rear panel and a side panel extending from one side of the rear panel. A plurality of supporting plates extends inwardly from the rear and the side panel to support a power supply thereon. The mounting bracket includes a first plate and a second plate extending from one side of the first plate. The rear panel defines a slot and the side panel defines a pair of locking apertures in respective outer portions thereof. The first plates forms a hook at the outmost edge thereof for rotatably received in the slot of the case. The second plate includes a pair of resilient catches and an operating rod. The power supply is placed on the supporting plates, the hook is rotatably received in the slot and the catches enter into the locking apertures so that the power supply is secured in the case.

In disassembly, the operating rod is moved to disengage the catches of the bracket from the locking apertures of the cases, thus the power supply can be easily taken out from the case.

Other objects, advantages and novel features of the present invention will be drawn from the following detailed description of a preferred embodiment of the present invention with attached drawings, in which:

DETAILED DESCRIPTION OF THE INVENTION

Figure 1:
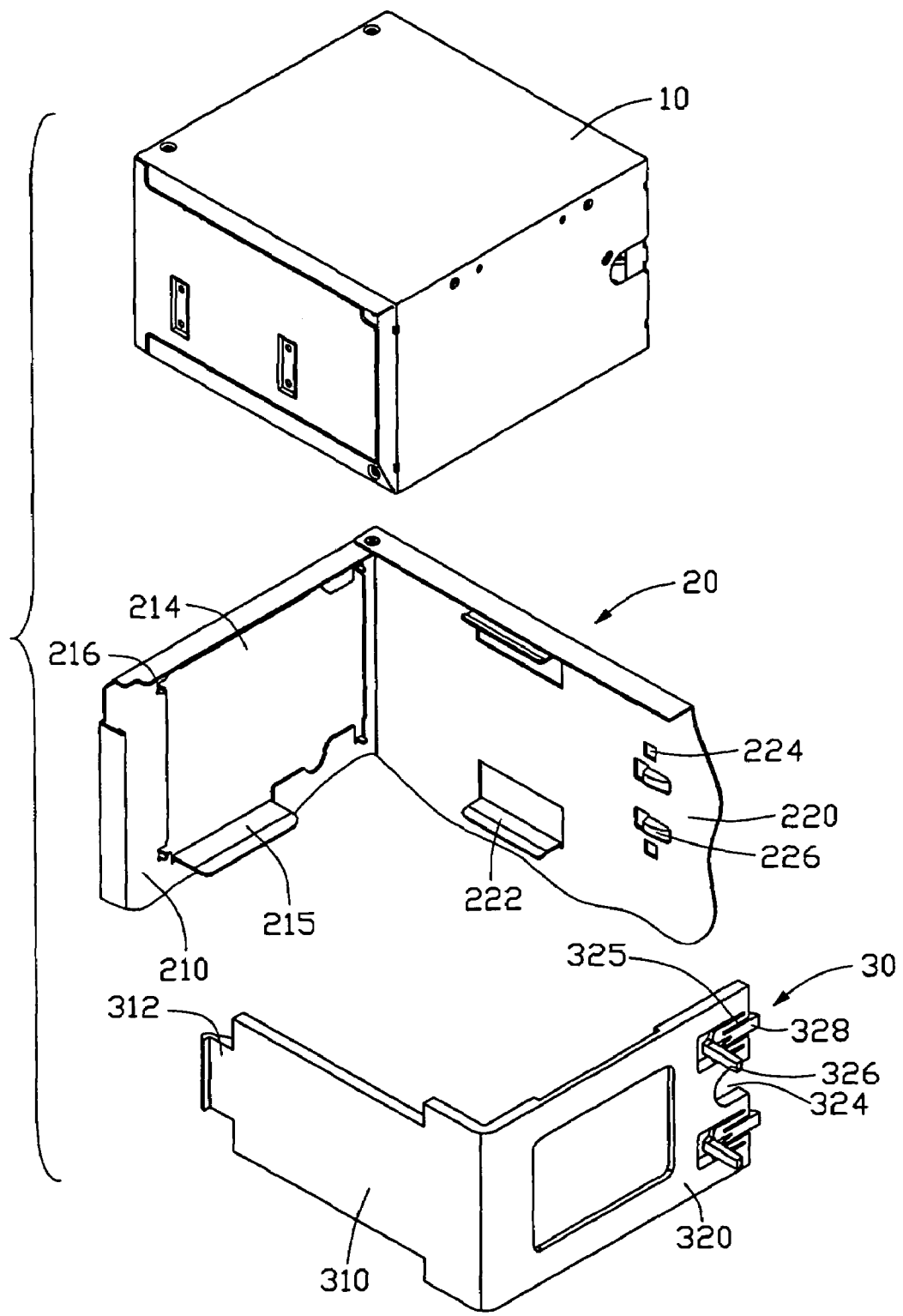
FIG. 1 is an exploded, isometric view of a mounting apparatus in accordance with the present invention, together with a power supply, the mounting apparatus comprising a computer case, and a mounting bracket.

Referring to FIG. 1, a mounting apparatus in accordance with the preferred embodiment of the present invention is used for securing a power supply 10. The mounting apparatus comprises a computer case 20, and a mounting bracket 30.

Figure 4:
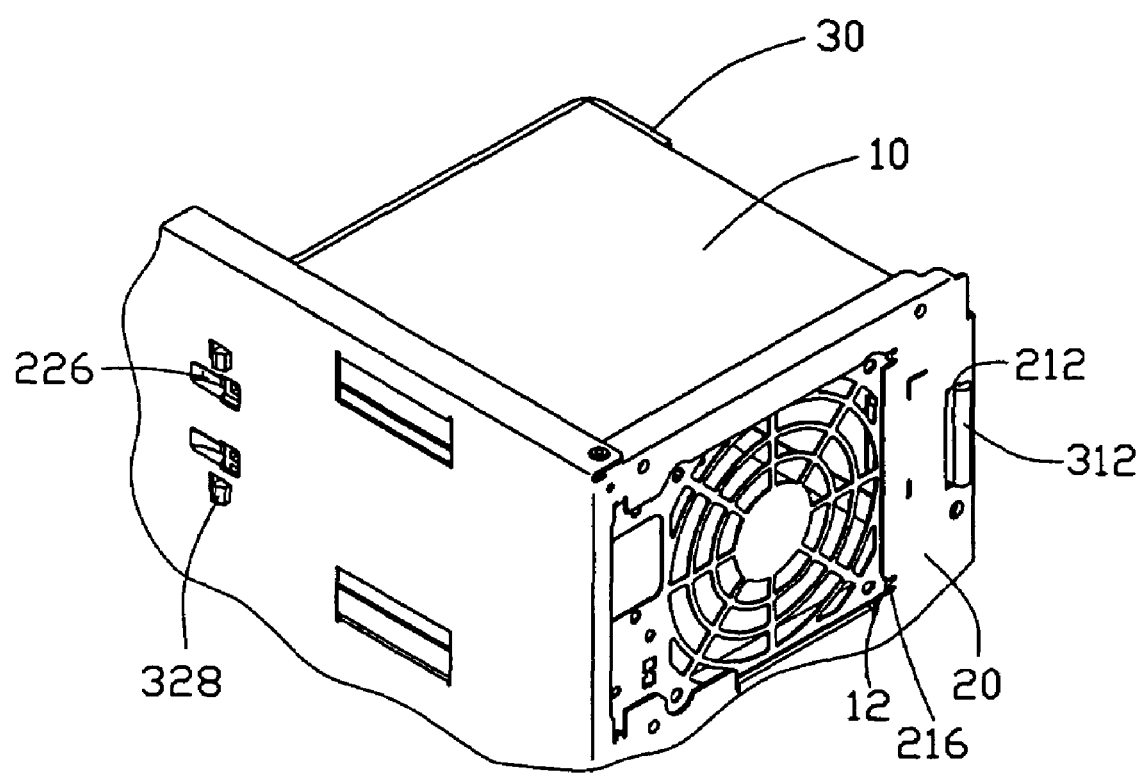
FIG. 4 is an assembled view of FIG. 1, showing the power supply received in the computer case.

Referring also to FIG. 4, the box-like power supply 10 comprises a plurality of ventilating apertures and fixing holes 12 in a rear wall thereof.

Figure 2:
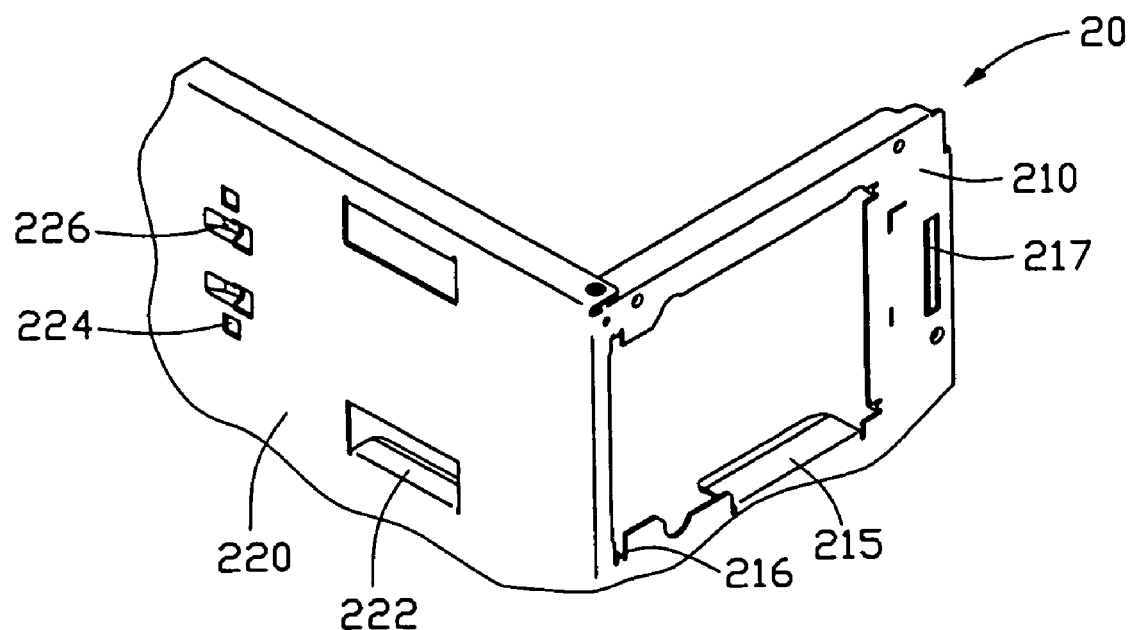
FIG. 2 is isometric view of the case of FIG. 1, but viewed from another aspect.

Referring also to FIG. 2, the computer case 20 comprises a rear panel 210, and a side panel 220 extending from one side of the rear panel 210. A rectangular opening 214 is defined in the rear panel 210, having a size fitting the power supply 10. A pair of first supporting plates 215 is stamped inwardly from an inner face of the rear panel 210 at the upper and lower sides of the opening 214. A plurality of tabs 216 extends inwardly besides the opening 214, corresponding to the fixing holes 12 of the power supply 10. A lengthways locking aperture 217 is defined in the rear panel 210 along a left side of the opening 214. A pair of second supporting plates 222 is stamped inwardly from an inner face of an upper portion and a lower portion of the side panel 220, corresponding to the first supporting plates 215 for cooperatively supporting the power supply 10 thereon. A pair of locking apertures 224 is defined in an outer portion of the side panel 220 near the second supporting plates 222. A pair of protruding blocks 226 extends inwardly from the side panel 220 besides the locking apertures 224.

Figure 3:
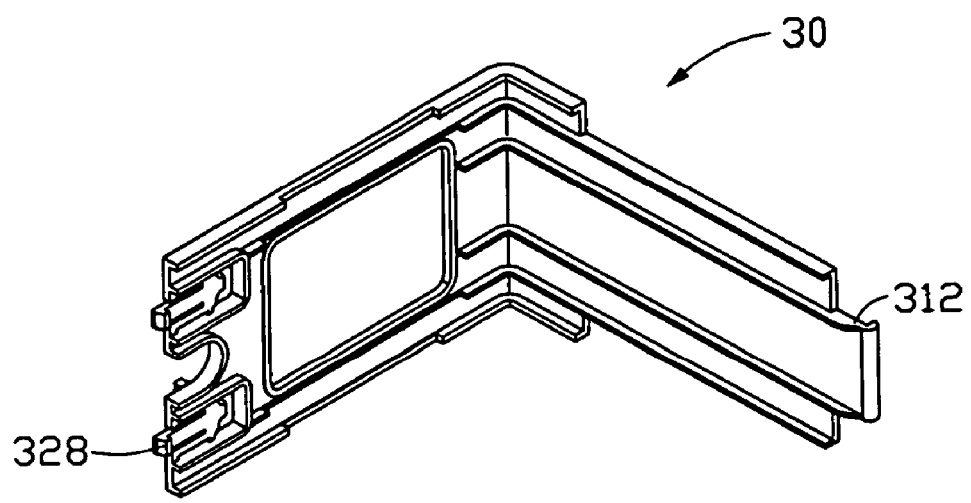
FIG. 3 is isometric view of the bracket of FIG. 1, but viewed from another aspect.

Referring also to FIG. 3, the bracket 30 is generally L-shaped and comprises a first plate 310 and a second plate 320 perpendicularly extending from one side of the first plate 310. A hook 312 is formed at a distal end portion of the first plate 310, corresponding to the slot 217 of the case 20. The hook 312 rotatably and slidably engages in the slot 217 of the rear panel 210. A generally semi-circled cutout 324 is defined in a right portion of the second plate 320. Two pair of resilient members 325 is stamped from the second plate 320 beside the cutout 324. An operating rod 326 extends perpendicularly and outwardly at an inner end of the resilient tabs 325 for manual operation. A horizontal catch 328 is formed between every pair of the resilient tabs 325 for engaging in the locking apertures 224 of the case 20.

Figure 5:
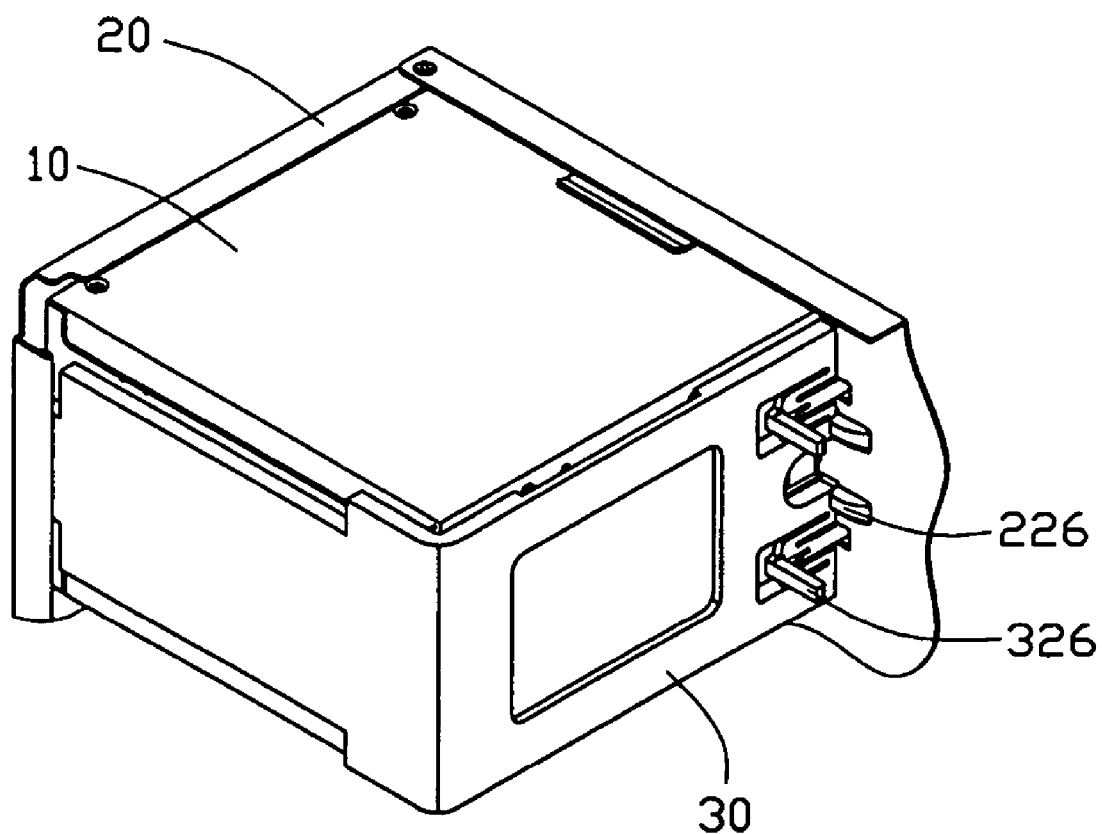
FIG. 5 is similar to FIG. 4, but viewed from another aspect.

Referring also to FIGS. 4 and 5, the power supply 10 is disposed on the first and second supporting plates 215, 222 of the case 20 with the tabs 216 extending into the fixing holes 12 of the power supper 10 and the ventilating apertures correspond to the opening 214. The bracket 20 is rotatably attached to the rear panel 210 of the case 20 with the hook 312 of the first plate 310 entering the slots 217 and rotatably received therein. The catches 328 of second plate 320 of the bracket 30 engage in the locking apertures 224 of the case 20 and the protruding blocks 226 abut against the outer surface of edge portions of the second plate 320. Thus the power supply 10 is secured in the case 20.

In disassembly, the operating rods 326 of the bracket is moved to disengage the catches 328 from the locking apertures 224 of the case 20, so that the mounting bracket 30 is rotated outwardly. The power supply 10 is then easily taken out from the computer case 20.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A mounting apparatus for securing a power supply, comprising:
    a case comprising a rear panel and a side panel arranged at one side of the rear panel, a plurality of supporting plates respectively formed from the rear and the side panels, at least one locking aperture defined in the side panel; and
    a mounting bracket rotatably attached to the rear panel of the case, and comprising a first plate and a second plate formed at one side of the first plate, the first plate located opposite the side panel, the second plate located opposite the rear panel, and the first and second plates cooperating with the side and rear panels to enclose the power supply for holding the power supply, at least one resilient catch formed in the second plate for engaging in said locking aperture of the case;
    wherein the power supply is disposed on the supporting plates, the first plate of the bracket is rotatably attached to the rear panel of the case, said at least one catch engages in said at least one locking aperture of the bracket to secure the power supply in the case; and
    wherein the second plate of the bracket comprises at least one resilient member formed in an outer portion thereof, said catch is inwardly formed at one end of said resilient member, an operating rod extends outwardly from another end of said resilient member.

2. The mounting apparatus as described in claim 1, wherein the rear wall of the case defines an opening and a slot beside the opening therein, the first plate of the bracket forms a hook at an outmost portion thereof rotatably received in the slot.

3. The mounting apparatus as described in claim 2, wherein a plurality of tabs extends inwardly besides the opening for engaging with the power supply.

4. The mounting apparatus as described in claim 1, wherein the side panel of the case further comprises at least one protruding block formed besides said locking aperture, for abutting against an outer surface of the second plate of the case.

5. The mounting apparatus as described in claim 1, wherein the side panel further forms a plate parallel to the supporting plate of the side panel to sandwich the power supply therebetween.

6. A mounting apparatus assembly comprising:
    a power supply defining at least one fixing hole in a wall thereon;
    a computer case comprising a rear panel and a side panel, an opening defined in the rear panel corresponding to the power supply, at least one tab formed at the rear panel besides the opening to engage in said fixing hole, a plurality of supporting plates extending inwardly from the rear panel and the side panel, a slot defined in the rear panel near the opening, a pair of locking apertures defined in the side panel; and
    a mounting bracket rotatably attached to the case, and comprising a first plate having a hook, and a second plate having at least one resilient member with a catch, the first and second plates cooperating with the rear and side panels to fully surround and hold the power supply;
    wherein the power supply is held on the supporting plates with said tab engaging in said fixing holes, the hook is rotatably received in the slot and said catch engages in said locking aperture to secure the power supply in the case; and
    wherein said catch is inwardly formed at one end of said resilient member, an operating rod extends outwardly from another end of said resilient member.

7. The mounting apparatus assembly as described in claim 6, wherein the side panel of the case further comprises at least one protruding block formed besides said locking aperture, for abutting against an outer surface of the second plate of the case.

8. A mounting apparatus assembly comprising:
    a power supply;
    a case comprising a rear panel and a side panel, a supporting plate formed from each of the rear panel and the side panel to support the power supply, a slot defined in the rear panel, a block formed at the side panel;
    a mounting bracket comprising a first plate and a second plate together with the rear panel and the side panel of the case to restrict the power supply therebetween, wherein the first plate has a hook rotatably and front-to-back slidably engaging in the slot of the rear panel, the second plate engages with the side panel, the block preventing the second plate from movement away from the power supply;
    wherein the second plate is disengaged from the side panel, the mounting bracket is rotated to be released from the block, and is moved forwardly to be further rotated away from the power supply.

9. The mounting apparatus as recited in claim 8, wherein the side panel further forms a parallel plate together with the supporting plate of the side panel to sandwich the power supply therebetween.

10. The computer as recited in claim 8, wherein the side panel defines a locking hole, the second plate forms a catch to engage in the locking hole.

11. The computer as recited in claim 10, wherein the second plate forms resilient portion at a distal end thereof, the catch is formed inwardly at an end of the resilient portion.

12. The computer as recited in claim 11, wherein an operating rod is formed outwardly at the other end of the resilient portion for manual operation.

13. The computer as recited in claim 8, wherein a plurality of tabs is formed inwardly from the rear panel for engaging in the power supply.

* * * * *